May 6, 1969  F. P. SPINELLI ET AL  3,443,252

MOTOR OPERATED RELAY

Filed July 7, 1967

INVENTORS:
FRANK P. SPINELLI
DOMINIK M. WIKTOR
BY
Breitenfeld & Levine
ATTORNEYS

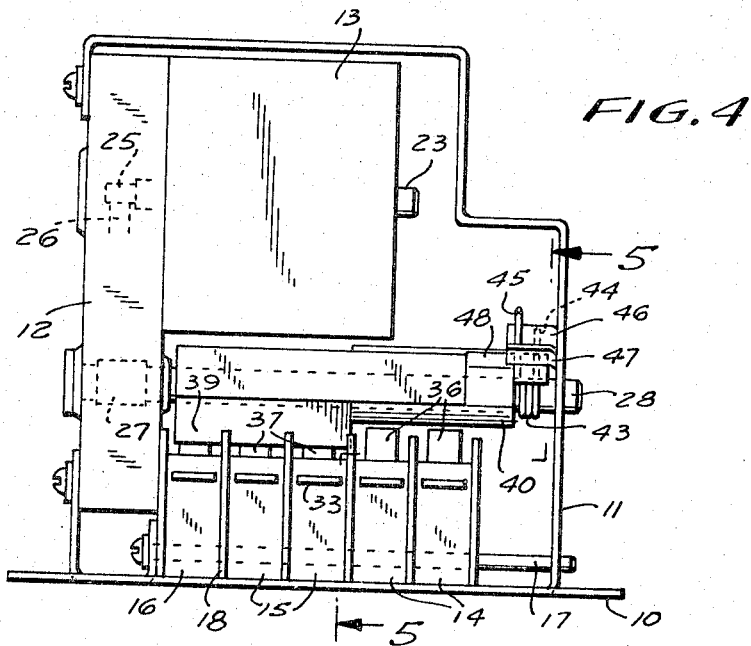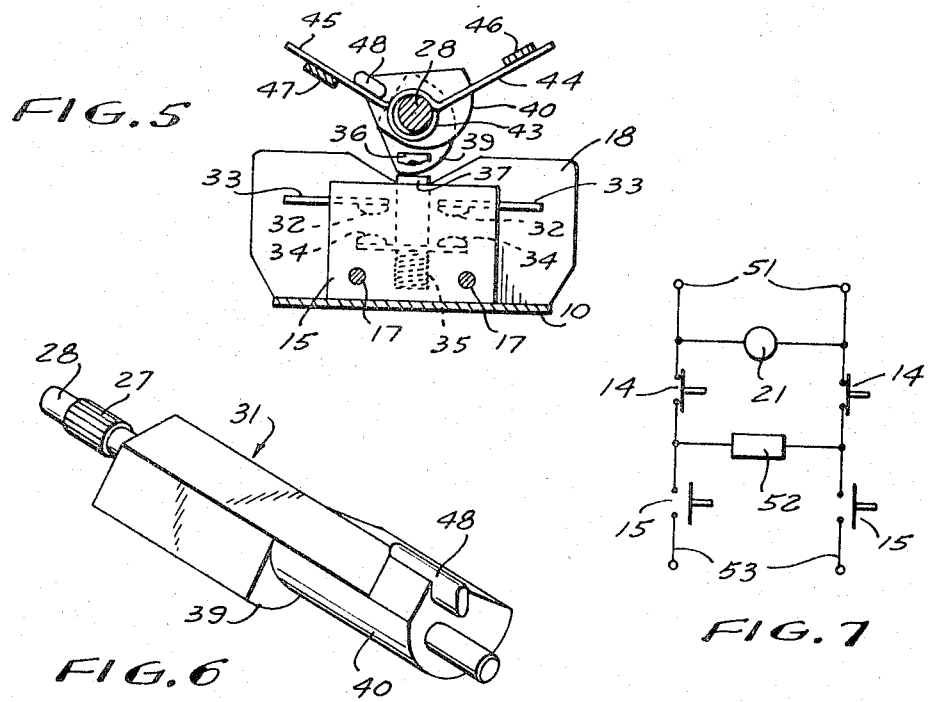

3,443,252
MOTOR OPERATED RELAY
Frank P. Spinelli, Brookside, and Dominik M. Wiktor, Cranford, N.J., assignors to Automatic Switch Company, a corporation of New York
Filed July 7, 1967, Ser. No. 651,810
Int. Cl. H01h 51/06, 3/26
U.S. Cl. 335—73                      1 Claim

ABSTRACT OF THE DISCLOSURE

Motor, such as shaded pole motor, drives actuator, such as a cam, to operate a switch. Motor shaft is checked after it rotates through predetermined angle, although motor remains energized, to define one position of actuator and switch. Resilient means returns actuator to its original position, when motor is deenergized, to define other position of switch.

Actuator may operate a bank of switches so that device can be used as a transfer relay. Motor shaft may rotate actuator via a gear train.

---

This invention relates to relays of the type which control the position of a switch in response to electrical energization. Examples of such relays are those operated by solenoids and electromagnets wherein an armature moves in one direction when the relay is energized, and is returned, usually by a spring, when the relay is deenergized.

The relay of the present invention is admirably suited for use as a transfer relay, although it will be obvious that it has many other uses. A transfer relay serves to transfer a load from a power source supplied by an electric utility to a standby power source when the utility source fails. The standby source is an electric generator adapted to be operated by a prime mover such as a gasoline or diesel engine. The engine and generator are, of course, at rest as long as the utility supplies power. Upon a failure, the transfer relay disconnects the load from the utility supply, and connects the load to the standby generator. At the same time, the engine is started to drive the standby generator.

A typical conventional transfer switch or relay includes an electromagnet comprising a U-shaped core, a coil surrounding one leg of the core, and a movable armature pivoted to the top of the other core leg. A set of stationary switch contacts is located on each side of the electromagnet, and the armature carries two sets of movable switch contacts which can alternatively engage one set of stationary contacts or the other. A spring urges the armature into a position in which one pair of stationary and movable contact sets engage, and a gap is produced between the armature and the core leg carrying the coil. The coil is connected to the utility source, and when the latter is functioning properly, the coil is energized. Consequently, the armature is attracted to the coil-carrying core leg, against the force of the spring, to close the gap, thereby causing the one pair of contact sets to open and the other pair to close. Closing of this other pair connects the utility source to the load, and opening the one pair disconnects the load from the standby generator. When the utility experiences a failure, the coil is deenergized and the spring returns the armature to its initial position wherein the one pair of contact sets close to connect the load to the standby source, and the other pair open to disconnect the load from the utility source.

Several problems exist in connection with transfer devices of the type just described. First, the coil is generally designed so that it will not overheat when energized by the relatively low current which it draws when there is no gap, i.e., when the armature engages the coil-carrying core leg. In this way the coil can be made relatively small in size and cost. The current drawn by the coil when there is a gap is much larger, but under normal conditions the larger current is applied for a very short period, i.e., while the armature moves to close the gap, and no damage is done to the coil. However, if when the electromagnet is deenergized, and the gap is present, voltage is supplied to the coil which is insufficient to close the gap, the coil will continuously draw a current having a value far above the value the coil is designed for, and hence it will overheat and burn out.

Second, under the condition of inadequate voltage mentioned above, the coil may be energized sufficiently to produce some movement of the armature to decrease the gap. This movement may be sufficient to reduce or cancel the contact pressure between the contacts which connect the load to the standby source, whereby the resistance between the contacts increases causing arcing and erosion of the contacts.

Third, electromagnets respond to energizing current instantaneously. Thus, when a standby source is in operation and supplying the load, and the disrupted utility source returns to operation, the armature instantly moves to close the switch contacts which connect the load to the utility source. If, due to arcing, current from the standby generator is still flowing to the load a disastrous short circuit may occur between the two sources. Thus, the arc at the contacts between the standby source and the load must be completely extinguished, instantly, before the other contacts engage.

It is an object of this invention to provide a relay, capable of being employed as a transfer device, which is immune to coil overheating due to application of an abnormally low voltage.

It is another object of the invention to provide such a relay wherein the voltage level to which it will respond can be controlled.

It is a further object of the invention to provide such a relay incorporating a delayed response to energizing voltage to insure that one set of contacts opens before another set closes.

It is an additional object of the invention to provide such a relay which is compact, inexpensive to manufacture, and easy to maintain.

To achieve these objectives, the invention provides a relay employing, in place of the usual solenoid or electromagnet, a motor capable of being stalled while energized without damage to its windings. An example of such a motor is a shaded pole motor. The motor shaft is arranged to rotate a member, such as a cam, adapted to actuate a switch. In addition, abutments are provided for defining a rest position of the cam when the motor is deenergized, and upon energization of the motor to check the rotation of the motor shaft after it rotates through a predetermined angle to define a forward position of the cam. The forward and rest positions of the cam correspond to two different positions (open and closed) of the switch. A spring is stressed as the cam moves from its rest to its forward position, and returns the cam to its rest position when the motor is deenergized.

If the relay is to be used as a transfer relay, it is provided with a sufficient number of switches, and the cam is provided with sufficient lobes, so that certain of the switches are open and others closed in each position of the cam. A gear train may be employed to transmit motor shaft rotation to the cam, thereby introducing a delay between energization of the motor and operation of the switches. If a gear train is used, the cam contacts the abutments through the spring so that the latter absorbs a good portion of the shock produced, rather than the entire shock being transmitted to the gear train.

In the drawings:

FIG. 4 is a side elevational view showing the relay when energized;

FIG. 5 is a vertical cross-sectional view taken on line 5—5 of FIG. 4;

FIG. 6 is a perspective view of the switch-actuating cam; and

FIG. 7 is a schematic view showing how the relay is connected if used as a transfer relay.

Figure 1:
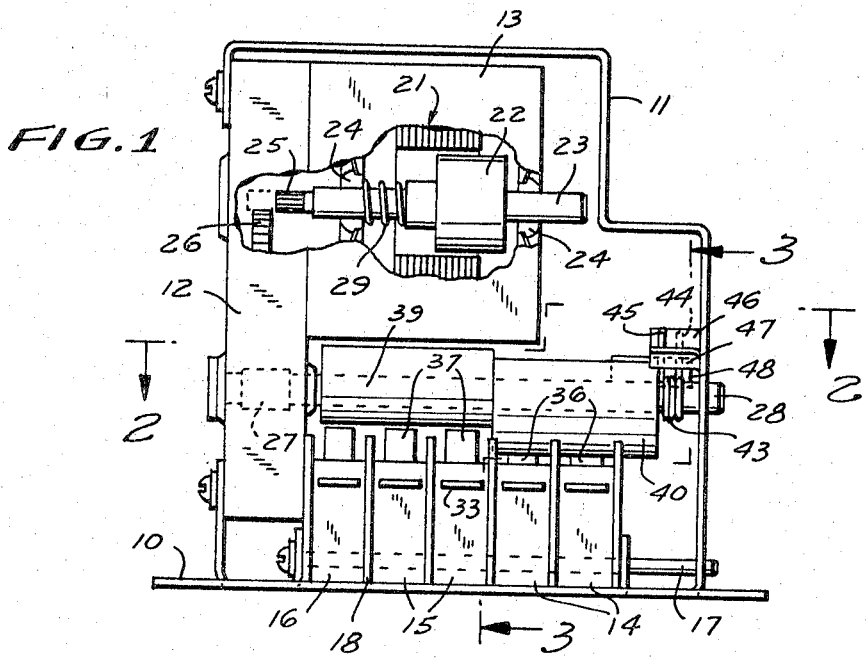
FIG. 1 is a side elevational view, with parts broken away, of a relay according to this invention, the relay being deenergized.
Figure 2:
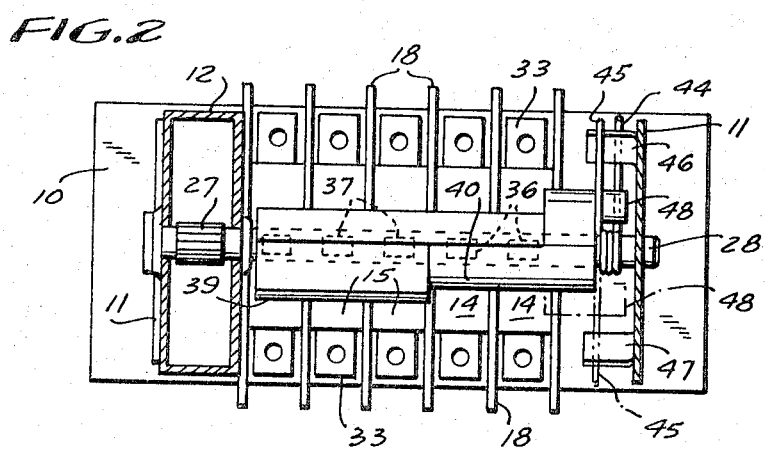
FIG. 2 is a horizontal cross sectional view taken on line 2—2 of FIG. 1.

In the present illustration, this invention is shown embodied in a relay adapted to be used as a transfer relay. However, it is to be understood that the invention may be employed in connection with other types of relays.

The illustrative relay includes a stationary base 10 supporting an upstanding frame 11. Fixed to the frame 11 is a gear housing 12 to which is attached a motor housing 13. Secured to the base 10 is a bank of five switches 14, 15, and 16, the switches being secured by pins 17 extending through the switches and tabs projecting upwardly from the base. Vertical insulating plates 18 are arranged between each two adjacent switches.

Within the housing 13 is a shaded pole motor 21 having a rotor 22 carrying a shaft 23, the shaft being rotatably and slidably held in bearings 24. One end of the shaft 23 projects into the housing 12 and carries a pinion 25 adapted to mesh with the uppermost gear 26 in a gear train located within the housing 12. As may be seen in FIG. 1, when the motor 21 is deenergized, a compression spring 29 surrounding the shaft 23 maintains the rotor 22 partially out of the stator. Consequently, the motor shaft 23 is also held in a rightward position, and the pinion 25 does not engage gear 26. However, when the motor is energized by a voltage above some preselected value, the force of the spring 29 is overcome, the rotor moves toward the left into the stator and rotates, and the pinion 25 meshes with gear 26. The lowermost gear 27 in the train is mounted on an output shaft 28, one end of which is rotatably supported by the housing 12, and the remainder of which extends over the switches 14–16 and is rotatably supported by the frame 11.

Figure 3:
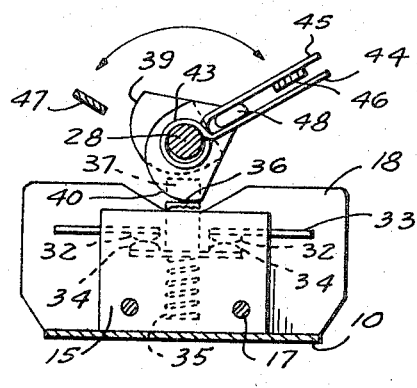
FIG. 3 is a vertical cross-sectional view taken on line 3—3 of FIG. 1.

As may be seen in FIGS. 3 and 5, each switch has a housing enclosing a pair of stationary contacts 32, electrically connected to terminals 33 outside the housing, and a pair of movable contacts 34 constantly urged upwardly toward the stationary contacts by a compression spring 35. When there is no downward force on the push buttons 36 of switches 14, or push buttons 37 of switches 15 and 16, the spring 35 maintains engagement between the contacts 32 and 34 of its respective switch.

A switch actuating means in the form of a cam 31 is fixed to and rotatable with the shaft 28. The cam as a whole extends over the entire bank of switches, and has two well-defined lobes arranged end to end. The lobe 39, closer to the gear housing 12 is long enough to extend over the three switches 15 and 16, and is so arranged that when the motor 21 is deenergized (FIG. 1), it is out of contact with the buttons 37 of these switches (FIG. 3). Consequently, the movable contacts of each switch are held up by the force of spring 35, and the switches 15 and 16 are maintained closed. The lobe 40 extends over the switches 14, and is arranged to press the push buttons 36 downwardly when the motor is deenergized. Consequently, switches 14 are held open against the force of their springs 35.

Surrounding the end of the output shaft 28 opposite the gear housing 12 is a coil spring 43 the end portions of which are straight and define arms 44 and 45. The frame 11 is formed with a pair of abutments 46 and 47, the abutment 46 being located between the spring arms 44 and 45, and the abutment 47 being located on the side of arm 45 opposite the arm 44. In addition, the cam lobe 40 presents a detent 48 arranged between the spring arms 44 and 45.

As shown in FIG. 7, when the present device is used as a transfer relay, the motor 21 is connected to the A.C. power lines 51 supplied by the utility. In addition, a load 52 is connected to the utility via switches 14. The load 52 is also connected to the lines 53 supplied by the standby generator via switches 15. If the utility supply is normal, the motor 21 is energized whereupon shaft 23 rotates and, via the gearing in housing 12, shaft 28 and cam 31 rotate. The detent 48 swings the spring arm 45 toward the left in FIGS. 3 and 5, but the abutment 46 prevents the arm 44 from following. Thus, the spring 43 is stressed. Rotation of the cam 32 continues until the spring arm 45 strikes the abutment 47 (FIG. 5). Further movement of the cam is thereby checked, as is further movement of the motor shaft 23. The motor may remain energized, however, by the utility power without damage to it because it is impedance protected. Since the detent 48 does not strike the abutment 47 directly, but instead through the resilient arm 45, the shock of contact is absorbed by the arm 45 and no damage is done to the gear train. In this condition (FIG. 4), the switches 14 are closed, and the switches 15 (and 16) are open. Thus, the load 52 is connected to the utility lines 51 and disconnected from the standby lines 53.

Should the utility power supply fail, the motor 21 will be deenergized. The spring 43 is then free to rotate the cam 32 to the position of FIG. 3. The movement of the cam is halted in a resilient manner when the spring arm 45 strikes the abutment 46. In this position of the cam (FIG. 1), the switches 14 are open and the switches 15 and 16 are closed. Consequently, the load is disconnected from the utility lines 51 and connected to the standby power lines 53. The switch 16, now closed, is employed to close a circuit (not shown) for starting the engine which drives the standby generator.

When normal utility power returns the motor 21 is again energized and rotates the cam 31 to the position of FIG. 4. The cam is so designed that during the initial portion of its rotation, the lobe 39 opens the switches 15 and 16. However, the switches 14 are not permitted to close until the latter portion of the cam rotation. Thus, there is a period during the central portion of the cam rotation when all switches are open. Consequently, there is no danger of a short circuit being produced between the utility source and the standby generator.

It should be mentioned that the spring 29 may be so chosen that the pinion 25 will not engage the gear 26 until a voltage above some predetermined value is applied to the motor 21. However, should a voltage below that value be applied to the motor, the latter will not be damaged.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claim.

What is claimed is:

1. A transfer relay comprising:
   (a) a motor of the type capable of being stalled while energized without damage to its windings, said motor having a rotatable shaft,
   (b) at least two switches, one being intended for use in connecting a load to a main source, and the other being intended for use in connecting the load to a standby source,
   (c) an output shaft, (d) speed reduction gearing between said motor and output shafts,
(e) means for limiting the rotational movement of said output shaft to an angle less than 360°, said limiting means including a resilient member for cushioning the shock when said output shaft is halted to prevent damage to said gear train, said output shaft moving to a forward position defined by said limiting means when said motor is energized,
(f) resilient means arranged to be stressed when said output shaft moves to said forward position, said resilient means serving to return said output shaft to a rest position defined by said limiting means when said motor is deenergized, and
(g) means carried by and rotatable with said output shaft for actuating said switches so that said main source switch is closed and said standby source switch is open when said output shaft is in its forward position, and said main source switch is open and said standby source switch is closed when said output shaft is in its rest position, said switch actuators being so arranged that at some point during the rotation of said output shaft between its rest and forward positions both of said switches are open, thereby eliminating all possibility of a short circuit between the main and standby sources.

References Cited
UNITED STATES PATENTS

| | | | |
|---|---|---|---|
| 1,720,189 | 7/1929 | Jackson | 335—73 |
| 2,794,091 | 5/1957 | Putz | 335—73 |
| 2,963,628 | 12/1960 | Ostland | 335—72 |
| 3,028,580 | 4/1962 | Durant | 335—72 |
| 3,153,159 | 10/1964 | Lord | 310—191 |
| 3,192,460 | 6/1965 | Wolff | 310—191 |

GORDON W. HARRIS, *Primary Examiner.*

H. BROOME, *Assistant Examiner.*